(12) United States Patent
Blessitt et al.

(10) Patent No.: US 9,069,106 B1
(45) Date of Patent: Jun. 30, 2015

(54) SYSTEMS, METHODS, AND DEVICES FOR PROVIDING AN EDGE-LIT LIGHT EMITTING DIODE LIGHT PANEL

(71) Applicants: James H. Blessitt, Peachtree City, GA (US); Ellis W. Patrick, Sharpsburg, GA (US)

(72) Inventors: James H. Blessitt, Peachtree City, GA (US); Ellis W. Patrick, Sharpsburg, GA (US)

(73) Assignee: Cooper Technologies Company, Houston, TX (US)

( * ) Notice: Subject to any disclaimer, the term of this patent is extended or adjusted under 35 U.S.C. 154(b) by 128 days.

(21) Appl. No.: 13/788,992

(22) Filed: Mar. 7, 2013

Related U.S. Application Data

(60) Provisional application No. 61/623,400, filed on Apr. 12, 2012.

(51) Int. Cl.
*F21V 7/04* (2006.01)
*F21V 8/00* (2006.01)

(52) U.S. Cl.
CPC ............ *G02B 6/0011* (2013.01); *G02B 6/0065* (2013.01)

(58) Field of Classification Search
CPC ................ G02B 6/0001; G02B 6/0038; G02F 1/133615
USPC ............ 362/217.1, 217.11, 217.12, 600, 632, 362/634
See application file for complete search history.

(56) References Cited

U.S. PATENT DOCUMENTS

| | | | | |
|---|---|---|---|---|
| 6,729,057 | B1 * | 5/2004 | Lu ............................... | 40/611.02 |
| 7,600,908 | B2 * | 10/2009 | Chang et al. .................. | 362/623 |
| 7,762,707 | B2 * | 7/2010 | Kim et al. ..................... | 362/632 |
| 8,593,589 | B2 * | 11/2013 | Yu ................................ | 349/65 |
| 8,826,572 | B2 * | 9/2014 | Kaoh ............................ | 40/544 |
| 2008/0007963 | A1 * | 1/2008 | Hsieh ........................... | 362/600 |
| 2013/0051067 | A1 * | 2/2013 | Chen ............................ | 362/607 |

* cited by examiner

*Primary Examiner* — Ali Alavi
(74) *Attorney, Agent, or Firm* — King & Spalding LLP

(57) ABSTRACT

An edge-lit light emitting diode (LED) light panel includes a frame that has a first plate, a second plate, and a channel partially bounded by the first plate and the second plate. The edge-lit LED light panel also includes a plurality of light emitting diodes (LEDs) disposed in the channel, and a wave guide disposed within the frame. The wave guide has an outer perimeter edge abutting the plurality of LEDs.

19 Claims, 7 Drawing Sheets

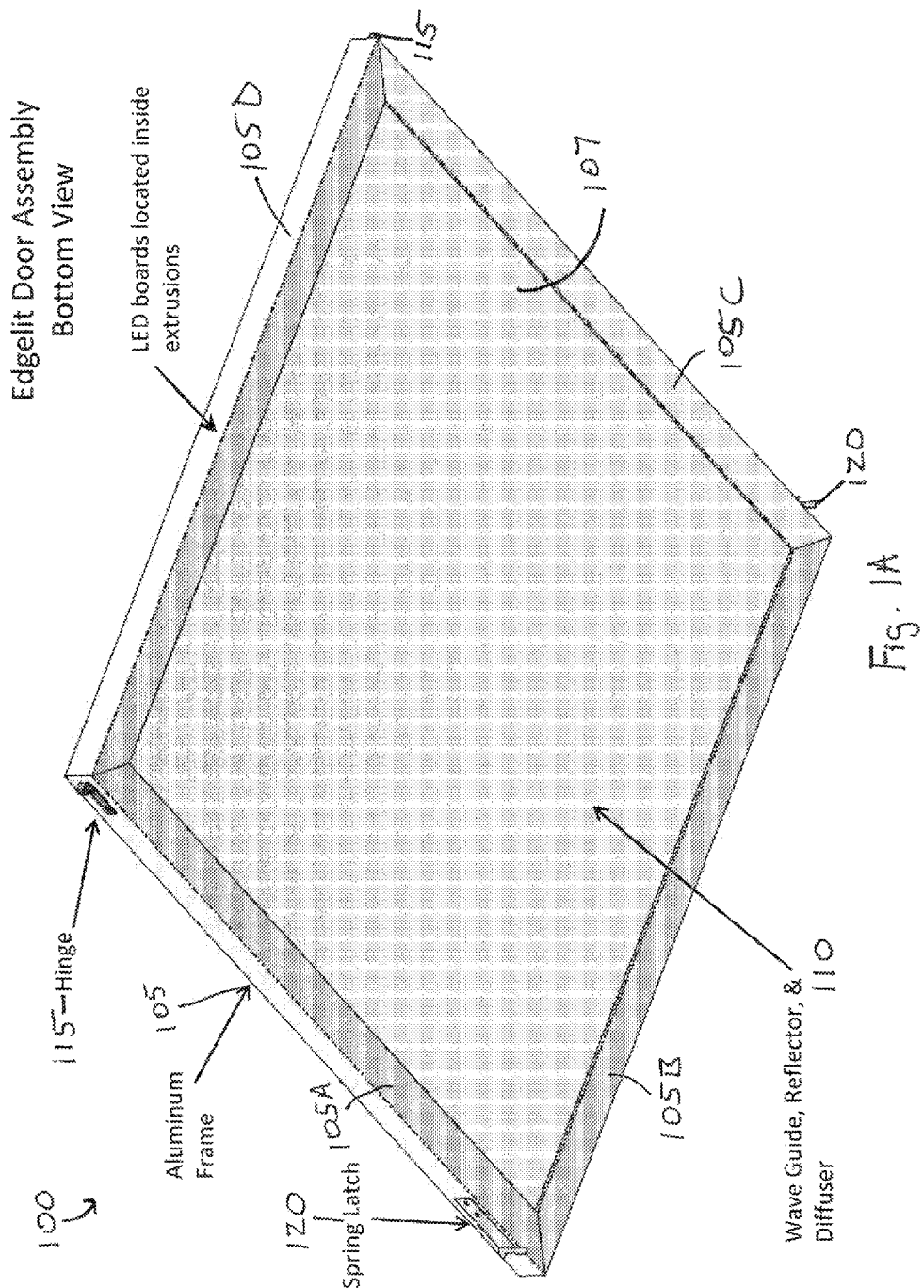

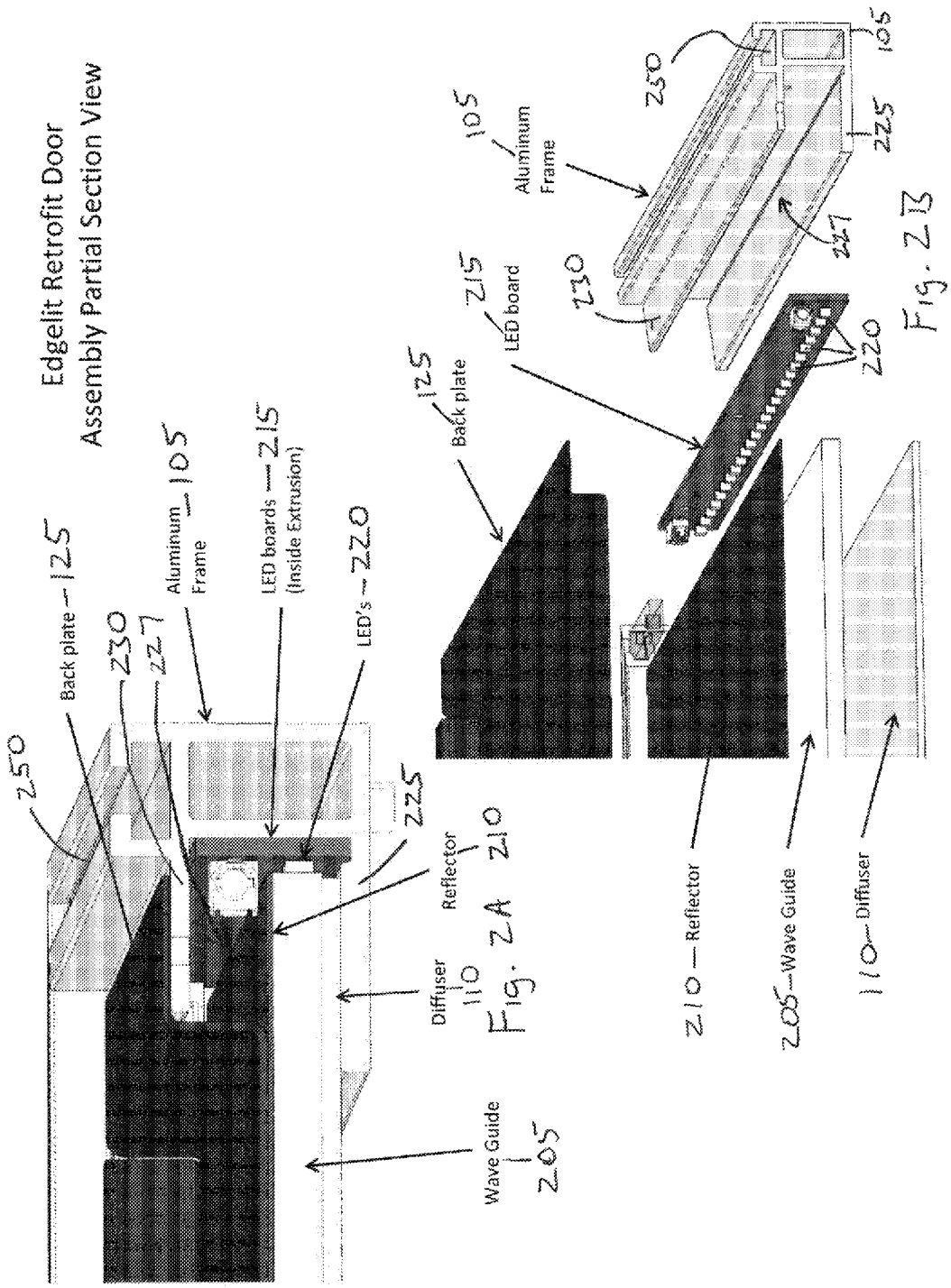

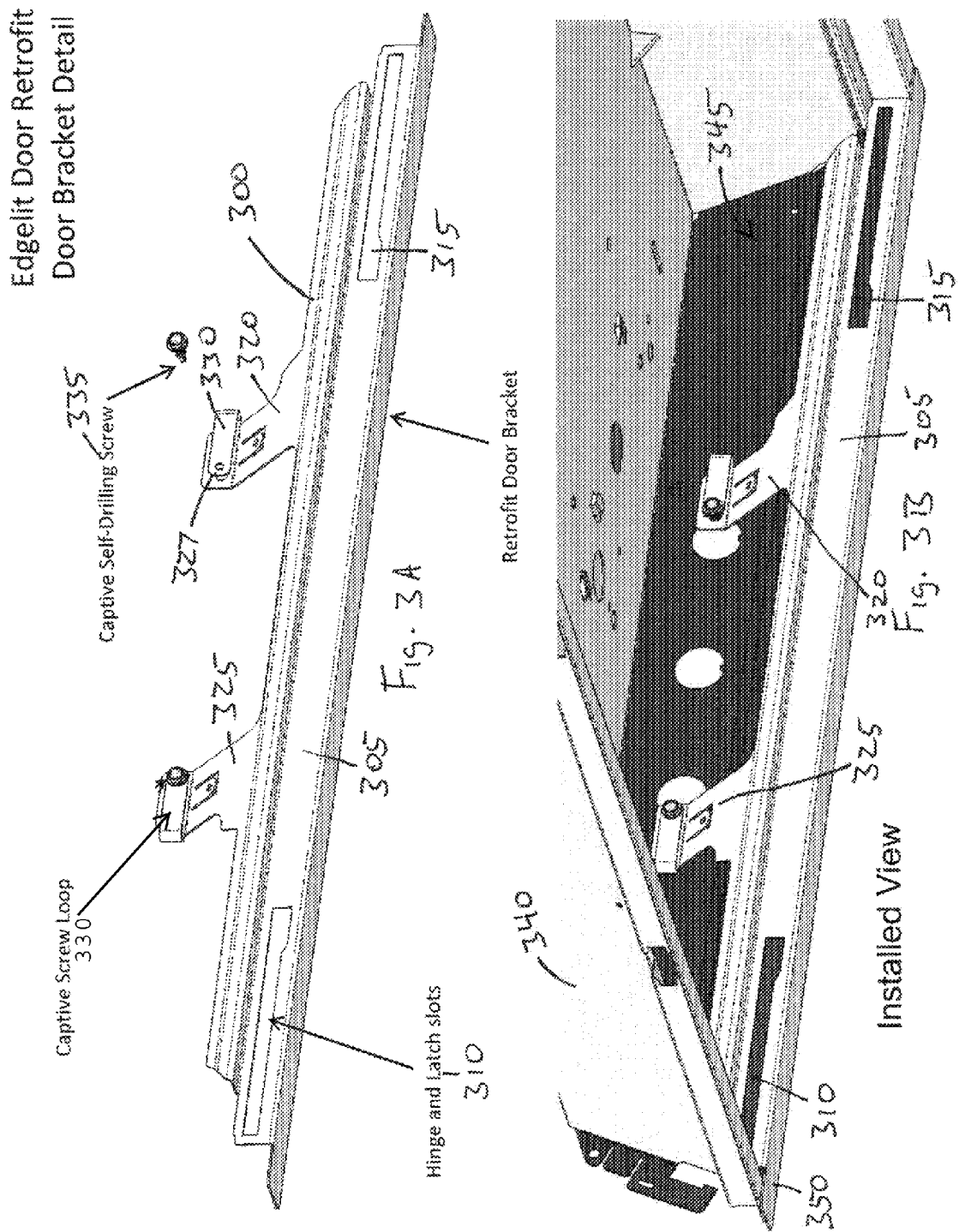

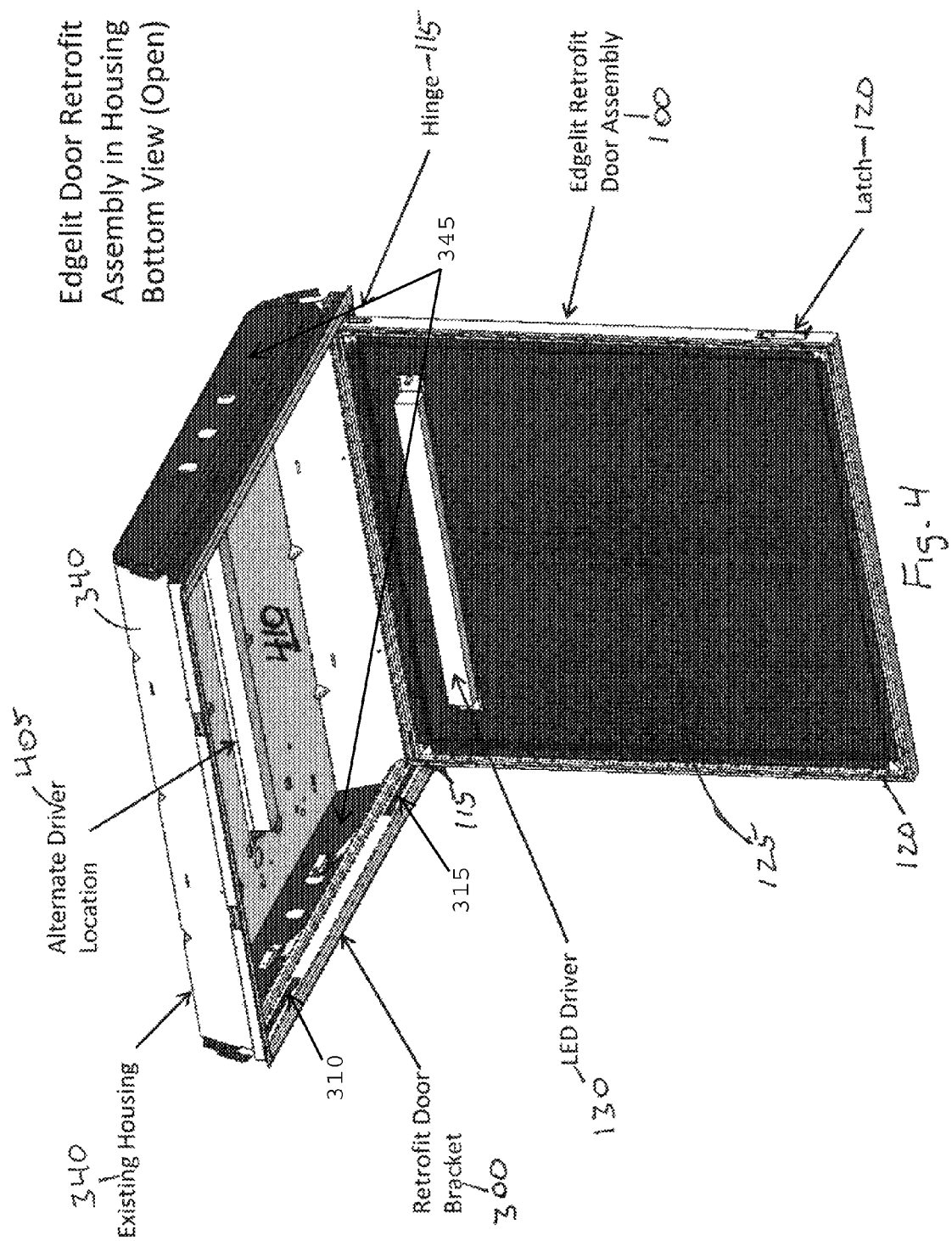

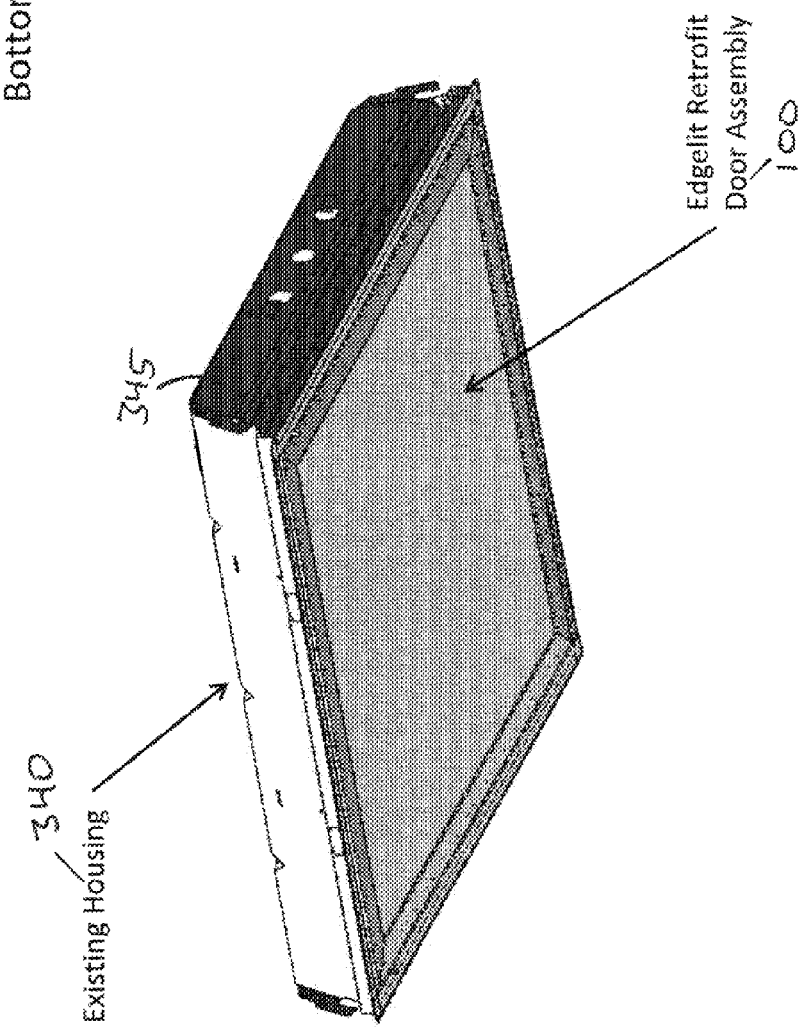

SYSTEMS, METHODS, AND DEVICES FOR PROVIDING AN EDGE-LIT LIGHT EMITTING DIODE LIGHT PANEL

RELATED APPLICATIONS

The present application claims priority to U.S. Provisional Patent Application No. 61/623,400, filed Apr. 12, 2012, and titled "Systems, Methods, And Devices For Providing An Edge-Lit Light Emitting Diode Light Panel," the entire content of which is incorporated herein by reference.

TECHNICAL FIELD

The present disclosure relates generally to lighting solutions, and more particularly to providing an edge-lit light emitting diode (LED) light panel as a luminaire and/or as a retrofit solution of an existing luminaire.

BACKGROUND

Some luminaires (e.g., troffer luminaires) may utilize light sources such as fluorescent light bulbs or standard arrangement of light emitting diodes (LEDs). However, for reasons such as improved illumination, an edge-lit light emitting diode (LED) lighting may be preferred over such luminaires. Replacing an existing luminaire with an edge-lit luminaire typically requires replacing the entire existing luminaire including the luminaire housing. Thus, replacing the entire existing luminaire can be expensive, time consuming, and can produce a large amount of waste that requires disposal. Further, even when the entire existing luminaire is not replaced, removing just parts of the existing luminaire typically requires extensive work and can be time consuming and costly. Thus, whether an entire existing luminaire or parts of the existing luminaire are removed to install an edge-lit LED based luminaire, the process may be relatively complicated, time consuming, and expensive.

Accordingly, an edge-lit LED light panel that simplifies retrofitting an existing luminaire or installation of a new luminaire may save time, cost, and may also reduce waste.

BRIEF DESCRIPTION OF THE FIGURES

Reference will now be made to the accompanying drawings, which are not necessarily drawn to scale, and wherein:

FIG. 1A is a bottom perspective view an edge-lit LED light panel in accordance with an example embodiment;

FIG. 2A is a partial cross-sectional view of the edge-lit LED light panel of FIG. 1A in accordance with an example embodiment;

FIG. 2B is a partial cross-section exploded view of the edge-lit LED light panel of FIG. 1A in accordance with an example embodiment;

FIGS. 3A and 3B are perspective and installation views of a retrofit mounting bracket in accordance with an example embodiment;

FIG. 4 is a perspective view of a retrofit installation of the edge-lit LED light panel in an open configuration in accordance with an example embodiment;

FIG. 5 is a perspective view of a retrofit installation of the edge-lit LED light panel in a closed configuration in accordance with an example embodiment.

SUMMARY

The present disclosure relates to systems, methods, and devices for providing an edge-lit light emitting diode (LED) light panel as a retrofit solution of an existing luminaire or as a new luminaire. In an example embodiment, an edge-lit LED light panel includes a frame that has a first plate, a second plate, and a channel partially bounded by the first plate and the second plate. The edge-lit LED light panel also includes a plurality of light emitting diodes (LEDs) that are disposed in the channel. The edge-lit LED light panel further includes a wave guide that is disposed within the frame. The wave guide has an outer perimeter edge abutting the plurality of LEDs.

In another example embodiment, a troffer luminaire includes a housing and an edge-lit LED light panel rotatably coupled to the housing. The edge-lit LED light panel includes a frame that has a first plate, a second plate, and a channel partially bounded by the first plate and the second plate. The edge-lit LED light panel also includes a plurality of light emitting diodes (LEDs) that are disposed in the channel. The edge-lit LED light panel further includes a wave guide that is disposed within the frame. The wave guide has an outer perimeter edge abutting the plurality of LEDs.

In another example embodiment, a method for retrofitting a troffer luminaire with an edge-lit light emitting diode (LED) light panel includes removing a light source from a troffer luminaire housing. The method also includes coupling a first mounting bracket inside the troffer luminaire housing to a first wall of the troffer luminaire housing. The method further includes coupling a second mounting bracket inside the troffer luminaire housing to a second wall of the troffer luminaire housing. The method also includes coupling an edge-lit light emitting diode (LED) panel to the first mounting bracket and to the second mounting bracket.

These and other aspects, objects, features, and embodiments will be apparent from the following description and the appended claims.

DETAILED DESCRIPTION OF EXAMPLE EMBODIMENTS

Example embodiments disclosed herein are directed to a troffer luminaire or any other type of luminaire or light fixture and an edge-lit LED door or light panel for use with the troffer luminaire either as a retrofit to a currently existing and installed troffer luminaire or as a stand-alone product with or without a housing included. The example embodiments provide the capability to retrofit a standard fluorescent or LED troffer luminaire housing with a replacement edge-lit LED light panel without having to remove most of the existing components in the previously-installed troffer. The ability to provide a new lighting fixture, without having to remove and dispose of a majority of the interior components of a previously-installed troffer, results in a quicker retrofit installation and reduced waste, thereby significantly reducing the cost to retrofit these types of luminaires.

Figure 1B:
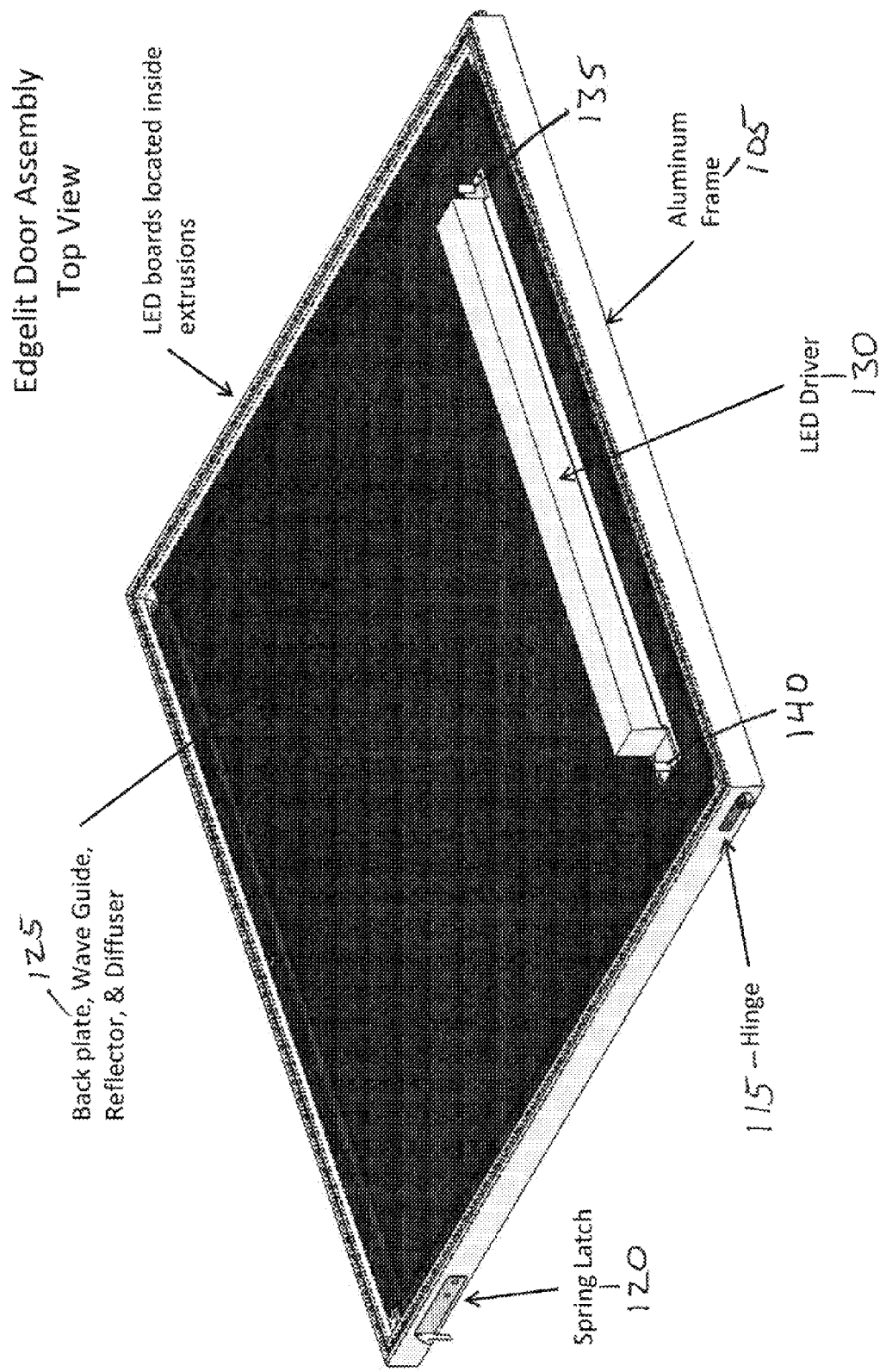
FIG. 1B is a top perspective view of the edge-lit LED light panel of FIG. 1A in accordance with an example embodiment.

FIG. 1A is a bottom perspective view of an edge-lit LED door or light panel 100 (also referred to herein as "light panel" or "panel") in accordance with an example embodiment. FIG. 1B is a top perspective view of the edge-lit LED light panel 100 of FIG. 1A. Referring now to FIGS. 1A-B, in an example embodiment, the edge-lit LED light panel 100 includes a frame 105 and a diffuser 110 disposed within (i.e., bounded by) the frame 105. The edge-lit LED light panel 100 also includes a wave guide disposed within the frame 105, as discussed with respect to FIGS. 2A and 2B. In certain example embodiments, the frame 105 is made of aluminum or any other metal or plastic materials and extends around or acts as an outer perimeter for the edge-lit LED light panel 100. In some example embodiments, the frame 105 is made of four frame members 105A-D that are each made of extruded aluminum. Each frame member 105A-D can make up one side of the panel 100. Each frame member 105A-D can be coupled to an adjacent frame member using known coupling devices, such as, for example, L-brackets and screws, bolts or rivets. For example, the member 105A may be coupled to the member 105B at one end of the member 105A and to the member 105D at another end of the member 105A. Those skilled in the art will recognize that welding or other alternative methods may be used to attach the frame members 105A-D as illustrated in FIGS. 1A and 1B.

Although the frame 105 is presented in FIGS. 1A-B as having a square shape, other geometric and non-geometric shapes are within the scope and spirit of this disclosure. For example, the frame 105 may be rectangular having two sides (e.g., 105A and 105C) that are longer than the other two sides (e.g., 105B and 105D). To illustrate, the panel 100 (thus, the frame 105) can be dimensioned to fit a two foot by two foot troffer housing (thus having a generally square shaped frame), a two foot by four foot troffer housing (thus having a generally non-square rectangular shaped frame), a one foot by four foot troffer housing or any other dimensions of troffer housing that has been or may be manufactured.

As illustrated in FIGS. 1A and 1B, frame members 105A and 105C are positioned on opposing sides of the panel 100. Each of the two frame members 105A and 105C includes a respective hinge 115 coupled to and positioned along an exterior side and adjacent to one end of the respective member 105A, 105C. Each of the two frame members 105A and 105C also includes a respective latch 120 coupled to and positioned along the exterior side on a distal opposing end of the respective member 105A, 105C. In certain example embodiments, the hinges 115 and the latches 120 are disposed along two opposing shorter frame members 105A and 105C or 105B and 105D. When the frame 105 is substantially square shaped, the hinges 115 and the latches 120 are disposed along either set of opposing frame members 105A and 105C or 105B and 105D.

In certain example embodiments, each hinge 115 is metallic and extends out from the surface of the exterior side of the respective member 105A or 105C and is slidably inserted into an aperture of a mounting bracket as described with respect to FIG. 3A. The hinges 115 provide a point or axis of rotation of the light panel 100 once installed in the troffer housing as discussed below. In certain example embodiments, each latch 120 is a spring latch or leaf spring made of a metallic material that extends generally out from the surface of the exterior side of the respective member 105A or 105C and is removably insertable into an aperture of the mounting bracket as described with respect to FIG. 3A. The latch 120, when inserted into the aperture of the mounting bracket maintains the panel 100 in a closed position within the troffer housing, as discussed in greater detail below.

In certain example embodiments, the diffuser 110 may be disposed within the frame 105 along a bottom side (a broad side) 107 facing an area to be illuminated. The inclusion of the diffuser 110 is optional. When the diffuser 110 is not included in the panel 100, a wave guide disposed within the frame 105 and illustrated in 2A can be viewed from the bottom side of the panel 100. In certain example embodiments, the diffuser 110 is opaque and prevents direct viewing of the wave guide 205 while also helping to more evenly distribute light out from the panel 100. The diffuser 100 can be constructed of plastic or alternatively of a Mylar film that is adhered to the bottom surface of the wave guide.

As illustrated in FIG. 1B, the panel 100 may include a back plate 125. The back plate 125 can be coupled to all or some of the frame members 105A-D. In certain example embodiments, the back plate 125 is made of aluminum, sheet metal, or any other metallic or plastic material and provides structural rigidity to the light emitting portion of the panel 100. For example, the back plate 125 can hold the wave guide 205, the reflector 110, and the diffuser 110 against the first plate 225. Further, in certain example embodiments, the back plate 125 may include a cavity or depressed area, or alternatively, the back plate 125 can be flat or concave. An LED driver 130 can be optionally coupled to the back plate using coupling devices 135, 140. The LED driver 130 may provide power to light emitting diodes (LEDs) disposed in the frame 105. Examples of coupling devices that may be used to couple the LED driver 130 to the back plate 125 include, but are not limited to screws, bolts rivets, tape, or any other type of adhesive. In alternative embodiments, an LED driver is coupled to a portion of the troffer housing as described below.

FIG. 2A is a partial cross-sectional view of the edge-lit LED light panel 100 in accordance with an example embodiment. FIG. 2B is a partial cross-section exploded view of the edge-lit LED light panel 100 in accordance with an example embodiment. In a particular embodiment, FIGS. 2A and 2B illustrate a partial cross-sectional view that corresponds to one or more of the frame members 105A-D of the frame 105 of FIGS. 1A and 1B. Now referring to FIGS. 2A-B, the frame 105 includes a first plate 225 and a second plate 230. In certain example embodiments, the first plate 225 and the second plate 230 are coupled to and extend out from a vertical side edge of the frame 105 in a horizontal or substantially horizontal manner. For example, the first plate 225 and the second plate 230 may be coupled to and extend out from a vertical side edge of the respective frame member 105A-D in a horizontal or substantially horizontal manner. Further, the first plate 225 and the second plate 230 are parallel or substantially parallel to each another. In addition, the first plate 225 and the second plate 230 are positioned such that a cavity or channel 227 is positioned between and defined by the first plate 225 and the second plate 230. In an example embodiment, the channel 227 is formed in each of the frame members 105A-D of the frame 105 and is continuous around the frame 105.

In certain example embodiments, LEDs 220 are positioned within the channel 227 of one or more of the frame members 105A-D. For example, LEDs 220 can be positioned in the channel 227 of each frame member 105A-D, in the channel of opposing members (e.g., the frame members 105B and D) or in the channel of just one member (e.g., the frame member 105B). For example, when the LEDs 220 are disposed in the channel of opposing frame members for a two foot by four foot troffer housing, the LEDs 220 are typically in the opposing members that have a greater length (i.e., the frame members that are about four feet long). Further, when providing the panel 105 for a one foot by four foot troffer housing, the LEDs 220 can be disposed in only one of the longer frame members 105A-D. In an example embodiment, the LEDs are electrically coupled to an LED driver, such as the LED driver 130 of FIG. 1B, by way of one or more wire harnesses disposed between the LEDs 220 and the LED driver 130.

The LEDs 220 can be disposed on one or more LED boards 215, such as a printed circuit board. The LEDs can be one or more discrete LED dies, one or more LED packages, an array of LEDs, such as an LED strip, one or more LED chip on board devices or an organic LED. Similarly, any number of LED strips may be positioned in the channel 227 such that they abut one another or with any amount of space left between the LED strips. Although the LED strip is shown to include a number of LEDs 220 arranged in a linear configuration on a single LED board 215, it should be understood that any configuration of LED assemblies may be used such that any number of LED assemblies may be arranged in an array of any size and shape within the scope of this disclosure. Further the LEDs 220 can include LEDs that emit white light or LEDs of differing colors to emit a wide variety of colored lights. In certain example embodiments, the LEDs include LEDs that emit white light and LEDs that emit red-shifted light. These two colors can be combined in the wave guide 205 to create a warm white light emitted from the panel 100.

In certain example embodiments, a wave guide 205, a reflector 210, and the diffuser 110 are also within the channel 227, sandwiched between the first plate 225 and the second plate 230 are. In certain example embodiments that include the diffuser 110, each of the diffuser 110, the wave guide 205, and the reflector 210 have substantially the same shape and each is a substantially flat planar member. The diffuser 110 includes a perimeter portion that includes at least a portion that is disposed between the first plate 225 and the wave guide 205 and includes a bottom surface that faces an area to be illuminated with, for example, downlight.

In certain example embodiments, the wave guide 205 is disposed within the frame 105, and an outer perimeter edge is disposed within the channel 227. In an example embodiment, the outer perimeter edge of the wave guide 205 abuts the LEDs 220. In alternative embodiments, the outer perimeter edge of the wave guide 205 may be positioned in the channel 227 close to the LEDs 220 without physically touching the LEDs 220. In embodiments that include the diffuser 110, the wave guide 205 is disposed between the diffuser 110 and the reflector 210. In embodiments that do not include the diffuser 110, a portion of the wave guide 205 proximal to the outer perimeter edge of the wave guide 205 abutting the LEDs 220 is disposed between the first plate 225 and the reflector 210.

The wave guide 205 has at least one edge that is disposed up against the LEDs 220 to receive the light being emitted by the LEDs and distribute that light across the wave guide 205 in an effort to create a generally consistent light level across the wave guide 205. In certain example embodiments, the wave guide 205 abuts the LEDs 220 in order to receive an increased amount of light output by the LEDs 220. In certain example embodiments, the wave guide 205 is made of acrylic and includes etchings on either the top surface or the bottom surface, or both to help distribute the light received from the LEDs 220 evenly or substantially evenly across the surface area of the wave guide 205. In certain example embodiments, the wave guide 205 also includes an etched surface along the portion of the wave guide 205 facing the area to be illuminated to reduce the reflectivity of the outer surface of the wave guide 205.

In certain example embodiments, the reflector 210 is positioned above the wave guide 205 and reflects light received from the wave guide 205 back through the wave guide 205 towards the area to be illuminated. The reflector 210 can be made of a white optic or high reflectance material or alternatively can be made of a metallic material and painted with a white high-reflectance paint. The back plate 125 is positioned above the reflector 210 and is coupled to one or more of the frame members 105A-D, for example, along the top surface of the second plate 230, using known coupling devices and methods.

The channel 227 may be designed based on particular thicknesses of the wave guide 205, the reflector 210, and the diffuser 110 when the diffuser 110 is included in the panel 100. For example, the channel 227 may be wide enough to fit standard thicknesses of the wave guide 205, the reflector 210, and the diffuser 110. However, as illustrated in FIG. 2A, both of the first plate 225 and the second plate 230 forming the channel 227 need not come into contact with the wave guide 205, the reflector 210, or the diffuser 110. For example, as illustrated in FIG. 2A, the first plate 225 is in contact with the diffuser 110 but the second plate 230 is not in contact with the reflector 210.

FIGS. 3A and 3B are perspective and installation views, respectively, of the retrofit mounting bracket 300 in accordance with certain example embodiments. Referring to FIGS. 3A-B, the mounting bracket 300 includes a longitudinally extending member 305 having elongated slotted apertures 310, 315 on opposing ends. For example, each hinge 115 of FIG. 1A may be slidably inserted in the elongated slotted aperture 315 of the respective mounting bracket 300. Similarly, each latch 120 of FIG. 1A may be removably inserted in the elongated slotted aperture 310 of the respective mounting bracket 300.

The mounting bracket 300 also includes one or more mounting members 320, 325 extending angularly in a generally vertical direction out from the longitudinally extending member 305. Each mounting member 320, 325 includes a mounting clip or captive screw loop 330 that includes an aperture 327 for receiving a screw 335 or other coupling device to couple the mounting bracket 300 to an end wall 345 of a troffer luminaire housing ("troffer housing") 340. In certain embodiments, two of the mounting bracket 300 may be attached to two opposite end walls 345 of the troffer housing 340. As shown in FIG. 3B, the mounting bracket 300 is coupled to one of the end walls 345 of the troffer housing 340 using a captive, self-drilling screw 335 through the apertures 327 of the mounting clip 330. By captive, it is meant that the screw is held in the aperture without the use of tools or manual holding or adjustment.

In an example embodiment, a retrofit kit for installing the panel 100 of FIGS. 1A and 1B into an existing housing, such as the troffer housing 340, can include the edge-lit LED light panel 100 and two mounting brackets, such as the mounting bracket 300. For example, the first mounting bracket may be attached to a first end wall of the troffer housing 340 and another mounting bracket may be attached to another end wall of the troffer housing 340 opposite the first end wall. FIG. 4 is a perspective view of an installed retrofit edge-lit LED light panel 100 in an open configuration in accordance with an example embodiment. FIG. 5 shows the installed retrofit edge-lit LED light panel 100 in a closed configuration. Referring to FIGS. 4 and 5, in certain example embodiments, the panel 100 may be in an open or closed configuration with respect to the troffer housing 340, which, in some example embodiments, is a pre-existing housing. As illustrated in FIG. 4, when the panel 100 is in the open configuration, the panel 100 is attached to the housing 340 at the hinges 115 and can rotate (i.e., swing) about the hinges 115. As illustrated in FIGS. 4 and 5, the panel 100 serves as a door to the troffer housing 340.

The panel 100 can be opened or closed with respect to the troffer housing 340 by manipulating the latches 120. Each latch 120 includes a manually adjustable tab that extends below the bottom surface of the frame 105. The tab on each latch 120 can be manipulated to open and close the panel 100. For example, by manipulating the respective tabs, each latch 120 can move out of its respective elongated slotted aperture 310 to decouple the latch 120 from the mounting bracket 300. Once each latch 120 is decoupled from the mounting bracket 300, the panel 100 can rotate/swing about the hinges 115 to the open configuration shown in FIG. 4. Once the panel 100 is opened, the panel 100 can be rotated to a closed position by rotating the panel 100 about the hinges 115 and positioning the latches 120 in respective elongated slotted apertures 310 of the respective brackets 300.

In certain example embodiments, the LED driver 130 is attached to the back plate 125 of the panel 100. In alternative embodiments, the LED driver 405 can be mounted to a top surface 410 or side wall 345 of the troffer housing 340 instead of being coupled to the back plate 125. Both options are shown in FIG. 4 and thus, two different LED drivers 130, 405 are shown when typically only one of the two options would be employed. While the troffer housing 340 is shown as being generally empty, an advantage of the device currently being disclosed is that the panel 100 is thin, such that many of the existing components previously disposed within the troffer housing 340 may be left within the troffer housing 340, including, but not limited to, the ballast, the sockets and socket tracks, the ballast cover, reflectors and any wiring between the ballast and the sockets.

Figure 6:
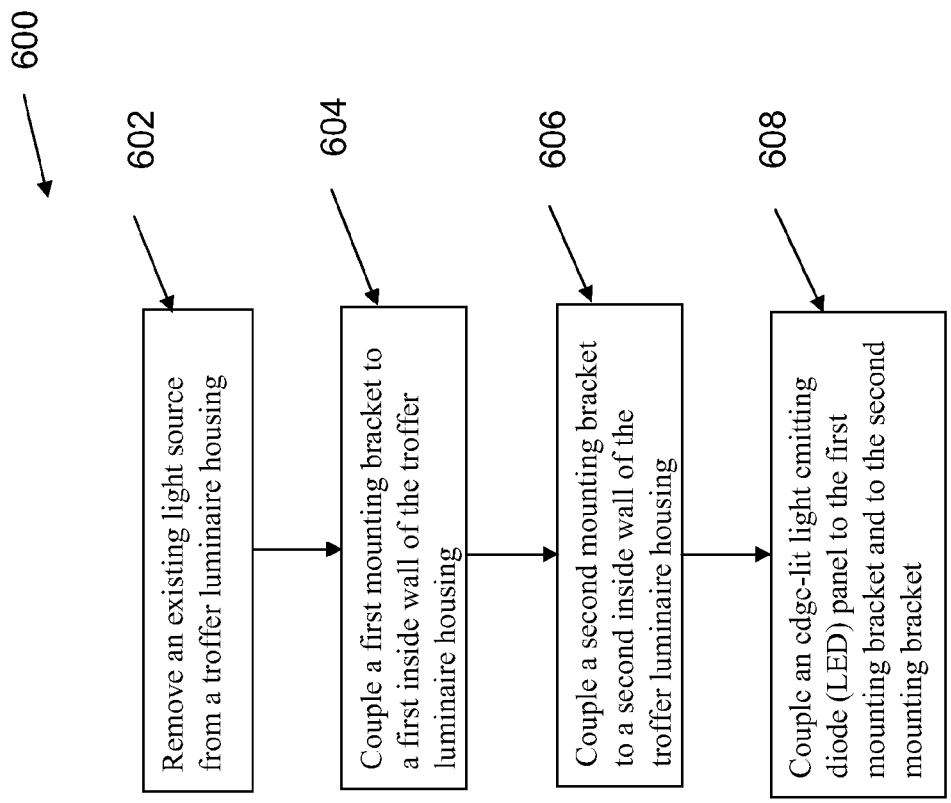
FIG. 6 illustrates a method for retrofitting a troffer luminaire with an edge-lit LED light panel of FIGS. 1A and 1B The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, reference numerals designate like or corresponding, but not necessarily identical, elements.

FIG. 6 illustrates a method for retrofitting a troffer luminaire with an edge-lit light emitting diode (LED) light panel. The method 600 includes removing a light source from a troffer luminaire housing, at 602. For example, a retrofit installation of the light panel 100 of FIGS. 1A and 1B may include removing light sources, such as fluorescent tubes, from the troffer housing 340, of FIG. 4. In certain example embodiments, other components within the troffer housing 340 can be removed or left within the troffer housing 340 including, but not limited to, ballast, sockets, socket track, ballast cover, and any associated wiring. In alternative example embodiments where LEDs or an LED strip was the original light source, the LEDs or the LED strip can also be left in the housing and potentially an existing driver for the existing troffer housing can be electrically coupled to the LEDs 220 and LED board 215 shown in FIGS. 2A and 2B.

At 604, the method 600 includes coupling a first mounting bracket inside the troffer luminaire housing to a first wall of the troffer luminaire housing. For example, the mounting bracket 300 may be coupled to the end wall 345 of the troffer housing 340 of FIG. 3B. In alternative embodiments, the mounting bracket 300 may be coupled to other structures of a ceiling or other structures instead of a luminaire housing. The method 600 also includes coupling a second mounting bracket inside the troffer luminaire housing to a second wall of the troffer luminaire housing, at 606. In an example embodiment, the first wall and the second wall of the troffer luminaire housing are opposite each other. In certain example embodiments, the first and second mounting brackets, such as two of the bracket 300 of FIG. 3A are disposed along and coupled to the two opposing shorter sides or walls of the luminaire housing 340 or along either set of opposing sides or walls of the luminaire housing 340 when the luminaire housing 340 is substantially square shaped.

At 608, the method 600 includes coupling an edge-lit light emitting diode (LED) panel to the first mounting bracket and to the second mounting bracket. For example, each of the hinges 115 on the frame 105 of the panel 100 are slidably inserted into respective elongated slotted apertures 315 of the respective mounting bracket 300. The panel 100 is rotatable about the hinges 115 and the axis defined by the hinges 115. The edge-lit LED light panel 100 can be rotated to a closed position by rotating the edge-lit LED light panel 100 about the hinges 115.

In certain example embodiments, the ballast (not shown) within the troffer housing 340 may be disconnected from the electrical power source and the wires to the electrical power source are electrically coupled to the LED driver 130 or 405. If the LED driver is coupled to the back plate 125 as shown in FIG. 1B, the LEDs 220 and the LED board 215 will typically already be electrically coupled to the LED driver 130. If the LED driver 405 is alternatively coupled to the troffer housing 340, a driver can be electrically coupled to the LEDs 220 and the LED board 215 with one or more wire harnesses.

Once the panel 100 in attached to the troffer housing 340 by coupling each hinge 115 to the respective bracket 300, the panel 100 can be rotated from an open position to a closed position by rotating the panel 100 about the hinges 115 and positioning the latches 120 in respective elongated slotted apertures 310 of the respective mounting brackets 300. Each latch 120 disposed on the respective frame member of two of the frame members 105A-D of the frame 105 may be removably inserted into the respective elongated slotted aperture 310 of the respective mounting bracket 300.

While the example embodiments described herein teach providing a panel and retrofitting a troffer housing with the edge-lit panel 100, alternatively, a luminaire could be provided initially with a housing and an edge-lit LED light panel rotatably coupled (for example, for maintenance access) to the housing or the side walls of the housing in a new fixture. In another alternative embodiment, the edge-lit panel 100 could be coupled directly to a ceiling or other surface and electrically coupled to an LED driver disposed behind the ceiling, other surface, behind a drop-ceiling panel, or at an area remote from the panel. In yet another alternative embodiment, the panel 100 could be hung from one or more cables that are attached at one end to a ceiling or other surface and coupled along the other end to the back plate 125 or to coupling devices disposed within a coupling channel 250 of FIG. 2B. In the alternative embodiment where the panel 100 is hung from one or more cables coupled to coupling devices in the coupling channel 250, the back plate 125 and reflector 210 could optionally be removed to provide a luminaire that provides both uplight and downlight from opposing surfaces of the wave guide 205.

Although particular embodiments have been described herein in detail, the descriptions are by way of example. The features of the embodiments described herein are representative and, in alternative embodiments, certain features, elements, and/or steps may be added or omitted. Additionally, modifications to aspects of the embodiments described herein may be made by those skilled in the art without departing from the spirit and scope of the following claims, the scope of which are to be accorded the broadest interpretation so as to encompass modifications and equivalent structures.

What is claimed is:

1. An edge-lit light emitting diode (LED) light panel, comprising:
   a frame having a first plate, a second plate, and a channel partially bounded by the first plate and the second plate;

a plurality of light emitting diodes (LEDs) disposed in the channel; and a wave guide disposed within the frame, the wave guide having an outer perimeter edge abutting the plurality of LEDs, wherein the frame comprises a first hinge on a first member of the frame and a second hinge on a second member of the frame and wherein the edge-lit LED light panel is capable of rotating about the first hinge and the second hinge.

2. The edge-lit LED light panel of claim 1, wherein the frame comprises a first latch on the first member of the frame and a second latch on the second member of the frame, wherein each of the first latch and the second latch is removably insertable into a respective slot of a respective attachment bracket of the housing.

3. The edge-lit LED light panel of claim 1, wherein the frame is substantially rectangular in shape, wherein the first member of the frame and the second member of the frame are opposite each other, wherein the channel is in a third member of the frame, and wherein the outer perimeter edge is disposed within the channel.

4. The edge-lit LED light panel of claim 3, wherein the frame further comprises a second channel in a fourth member of the frame, wherein a second plurality of LEDs are disposed in the second channel, and wherein a second perimeter edge of the wave guide is disposed in the second channel.

5. The edge-lit LED light panel of claim 1, further comprising a reflector substantially covering a broad surface of the wave guide and partially disposed in the channel between the second plate of the frame and the wave guide.

6. The edge-lit LED light panel of 5, further comprising a diffuser substantially covering a second broad surface of the wave guide, the second broad surface being opposite the broad surface, wherein the diffuser is partially disposed in the channel between the first plate and the wave guide.

7. The edge-lit LED light panel of 5, further comprising a back plate and a light emitting diode driver attached to the back plate, wherein the back plate is attached to the frame and substantially covers the reflector.

8. A troffer luminaire, comprising:
a housing: and
an edge-lit LED light panel rotatably coupled to the housing, the edge-lit LED light panel comprising:
 a frame having a first plate, a second plate, and a channel partially bounded by the first plate and the second plate;
 a plurality of light emitting diodes (LEDs) disposed in the channel; and
 a wave guide disposed within the frame, the wave guide having an outer perimeter edge abutting the plurality of LEDs.

9. The troffer luminaire of claim 8, wherein the frame comprises a first hinge, a second hinge, a first latch, and a second latch, wherein the first hinge and the first latch are disposed on a first member of the frame and wherein the second hinge and the second latch are disposed on a second member of the frame.

10. The troffer luminaire of 9, further comprising a first bracket and a second bracket that are at least partially positioned inside the housing and attached to opposite sides the housing, wherein the first hinge is positioned in a first slot of a first bracket, wherein the second hinge is positioned in a first slot of a second bracket, and wherein the edge-lit LED light panel is rotatable about the first hinge and the second hinge.

11. The troffer luminaire of claim 10, wherein the first latch is removably inserted in a second slot of the first bracket and wherein the second latch is removably inserted in a second slot of the second bracket.

12. The troffer luminaire of claim 9, wherein the frame is substantially rectangular in shape, wherein the first member of the frame and the second member of the frame are opposite each other, wherein the channel is in the first member of the frame, and wherein the outer perimeter edge is disposed within the channel.

13. The troffer luminaire of claim 9, wherein the frame is substantially rectangular in shape, wherein the first member of the frame and the second member of the frame are opposite each other, wherein the first member and the second member are longer than a third member of the frame, and wherein the channel is in the third member of the frame.

14. The troffer luminaire of claim 8, further comprising an LED driver attached to the housing.

15. The troffer luminaire of claim 8, further comprising an LED driver and a back plate, wherein the back plate is attached to the frame and wherein the LED driver is attached to the back plate.

16. A method for retrofitting a troffer luminaire with an edge-lit light emitting diode (LED) light panel, the method comprising:
removing a light source from a troffer luminaire housing;
coupling a first mounting bracket inside the troffer luminaire housing to a first wall of the troffer luminaire housing;
coupling a second mounting bracket inside the troffer luminaire housing to a second wall of the troffer luminaire housing;
coupling an edge-lit light emitting diode (LED) panel to the first mounting bracket and to the second mounting bracket.

17. The method of claim 16, wherein the edge-lit LED light panel comprises:
a frame having a first plate, a second plate, and a channel partially bounded by the first plate and the second plate;
a plurality of light emitting diodes (LEDs) disposed in the channel; and
a wave guide disposed within the frame, the wave guide having an outer perimeter edge abutting the plurality of LEDs, wherein the outer perimeter edge is disposed within the channel.

18. The method of claim 16, wherein coupling the edge-lit LED light panel to the first mounting bracket and to the second mounting bracket comprises:
slidably inserting a first hinge disposed on a first member of the frame into an elongated slot of the first mounting bracket; and
slidably inserting a second hinge attached to a second member of the frame into an elongated slot of the second mounting bracket, and wherein the edge-lit LED light panel is rotatable about the first hinge and the second hinge.

19. The method of claim 18, wherein coupling the edge-lit LED light panel to the first mounting bracket and to the second mounting bracket further comprises:
removably inserting a first latch disposed on the first member of the frame into a second elongated slot of the first mounting bracket; and
removably inserting a second latch disposed on the second member of the frame into a second elongated slot of the second mounting bracket.

\* \* \* \* \*